H. R. GOODFELLOW.
KNIFE SHIELD FOR SLICING MACHINES.
APPLICATION FILED JUNE 14, 1915.
1,163,335.
Patented Dec. 7, 1915.
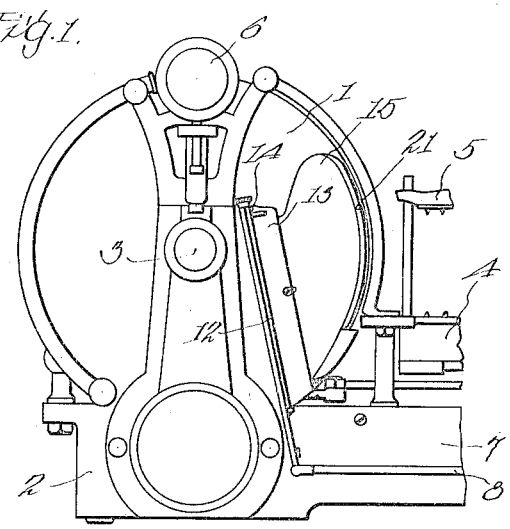
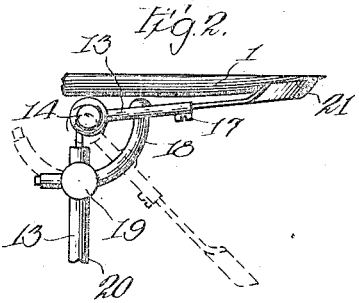
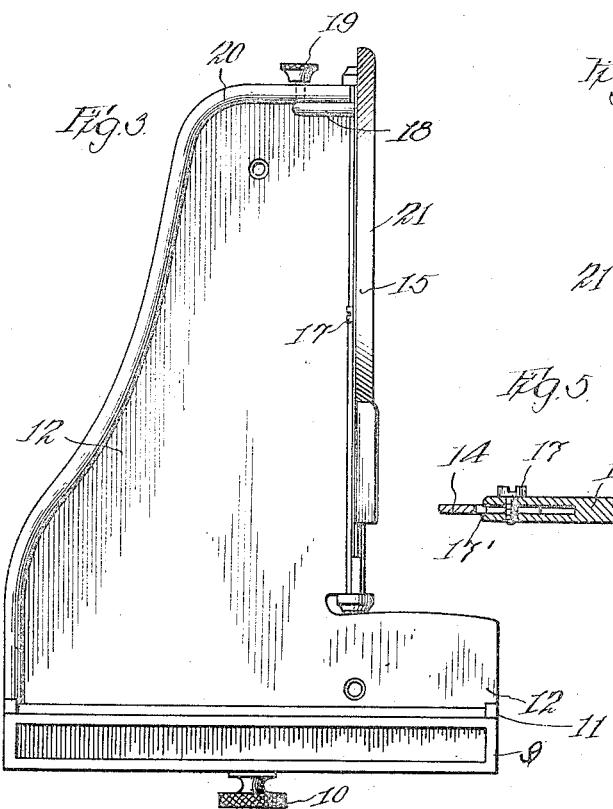
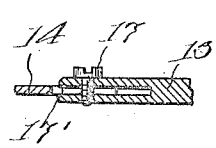
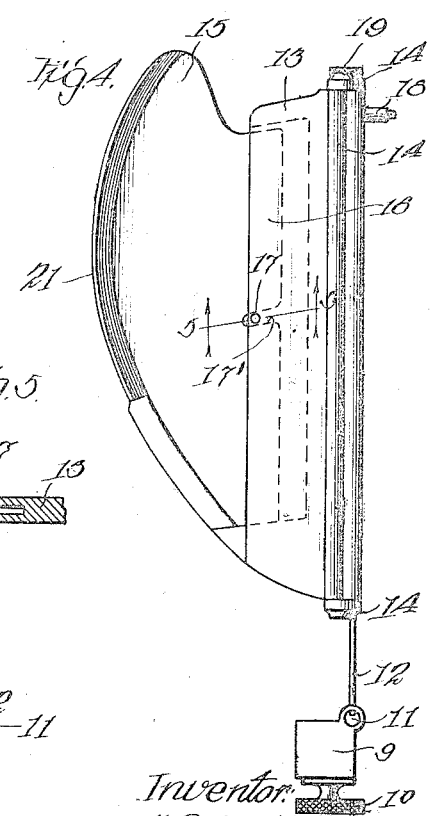

UNITED STATES PATENT OFFICE.

HERBERT R. GOODFELLOW, OF LAPORTE, INDIANA, ASSIGNOR TO U. S. SLICING MACHINE CO., OF CHICAGO, ILLINOIS, A CORPORATION OF ILLINOIS.

KNIFE-SHIELD FOR SLICING-MACHINES.

1,163,335.  Specification of Letters Patent.  Patented Dec. 7, 1915.

Application filed June 14, 1915. Serial No. 33,880.

*To all whom it may concern:*

Be it known that I, HERBERT R. GOODFELLOW, a subject of the King of England, residing at Laporte, in the county of Laporte and State of Indiana, have invented certain new and useful Improvements in Knife-Shields for Slicing-Machines, of which the following is a specification.

This invention relates to a shield for a rotary disk knife for a meat slicing machine, and consists substantially in the combination and arrangement of parts hereinafter described, illustrated in the accompanying drawings and more particularly set forth in the appended claims.

In the drawings—Figure 1 is a fragmentary side elevation of a portion of a meat slicing machine to which the present invention is applied. Fig. 2 is a fragmentary top plan view of the knife shield showing the shield in inoperative position in broken lines. Fig. 3 is an elevation of a portion of the slice tray with the knife shield attached thereto. Fig. 4 is an elevational view looking toward the left in Fig. 3; and Fig. 5 is a fragmentary sectional view on line 5—5 of Fig. 4.

In the drawings, the numeral 1 designates a rotary disk meat slicing knife carried on a frame 2, and adapted to rotate about 3 as a center. A reciprocating table 4 is arranged to carry the meat to be sliced and move it into contact with the slicing knife, the table moving to the left in Fig. 1 during the slicing operation. A meat clamp 5 is mounted on table 4 to hold the meat in position. At the upper part of the frame 2 is mounted a sharpening device 6, in the usual manner, for grinding the rotary blade 1 whenever required.

Numeral 7 represents a tray for catching the slices of meat as they are cut off, provided with a bottom board 8 upon which the slices rest.

In slicing meats of various kinds, especially where the meat is cut into very thin slices, it is necessary to prevent the slices from coming into contact with the surface of the rotary knife, so far as it is possible to do so, in order that the slices may not be broken up by the knife. Heretofore a shield has been arranged to cover a portion of the surface of the rotary knife for this purpose, and the present invention is designed to make the operation of such a shield more effective and to overcome difficulties which have arisen in keeping the shield and adjacent parts clean and in a sanitary condition. Fitted over the end of the bottom portion 8 of the slice tray, is a hollow socket member 9 having a set screw 10 to hold it firmly secured to the tray. Hinged at 11 to the member 9, is an upright plate 12 which forms a closure for the end of the tray 7 and extends upwardly therefrom as shown in Fig. 1, to catch the slices as they are cut from the meat and guide them into the tray. On the edge of the plate 12 next the slicing knife, is secured a socket member 13 by means of a hinge connection 14. This socket member, as indicated in Fig. 2, is free to swing about the pivot 14 toward and away from the slicing knife 1.

The knife shield 15 has one edge thereof 16 positioned within the socket member 13 and held in place by a screw 17 which passes through the two sides of the member 13 and through a slot 17' in the shield 15. It will thus be apparent that the shield 15 may be adjusted in the socket member 13 in a direction parallel with the cutting plane of the knife, and firmly held in any adjusted position by the screw 17 which clamps the sides of the member 13 against the edge 16 of the shield. The portion of the member 15 which enters the member 13, is made slightly shorter than the opening in the member 13, so that the shield 15 may have a slight pivotal movement about the screw 17 to properly position it relative to the cutting edge of the knife 1. An arcuate bar 18 is rigidly secured to the socket member 13 and passes through an opening in the plate 12. A thumb screw 19 is threaded into a rib 20, which extends around the outer portion of the plate 12, and is adapted to hold the shield 15 in any position in which it is set relative to the knife 1, by rotation on the pivotal support 14.

It has been found by practical experience that in order to obtain the best results from a shield of this character, the shield should be mounted with a portion 21 thereof which has the same radius of curvature as the slicing knife, in position barely to clear the lateral surface of the knife and as near to the edge of the knife radially as is possible, without interfering with the cutting operation of the knife. The applicant has found that the shield may be placed as close as a sixteenth of an inch to the edge of the knife without interfering with the slicing function of the knife, and that when so positioned the slices are much less liable to tearing and breaking than they have formerly been where the shield was positioned a considerable distance from the knife edge. The slicing knife, however, must be frequently ground to maintain a sufficiently sharp edge for the work required of it, and this grinding constantly reduces the diameter of the knife. If a shield is placed as close to the edge as is desirable when the machine is new, it is merely a matter of a short time until it begins to interfere with the cutting operation of the knife. To overcome this difficulty, the shield in the present device is made separate from the support instead of integral therewith as has formerly been the case, and is adjustably secured to the support. By this arrangement, as the knife wears away, the shield may be moved backwardly and thus always maintained at the proper distance from the edge of the knife to secure the best results. Another serious trouble has been found in connection with the operation of a shield of this character, and that is that small portions of meat continually enter between the shield and the knife and adhere to the inner edge of the shield where they become rancid and render the device unsanitary. In order to clean the shield of such collected particles, it has heretofore been necessary to remove the entire slice pan to which the shield has been attached, which is a somewhat troublesome operation and is very likely to be neglected by the average butcher's clerk. In the present invention, the shield is hinged to the slice pan as described above in such a way that it may be readily swung outwardly away from the knife for the purpose of cleaning, and after the shield and the surface of the knife have thus been cleaned, the shield may again be adjusted as closely to the knife as is permissible without interfering with its rotation.

It will thus be apparent from the above description that the present invention provides a much more efficient and sanitary shield than those heretofore in use.

What I claim is:

1. In combination, a meat slicing knife, a shield for preventing slices of meat from contacting with the side of said knife, and means for adjusting said shield parallel with the cutting plane of said knife toward and away from the edge thereof.

2. In combination, a rotary circular meat slicing knife, a stationary shield having one of its edges curved to conform with the curvature of the knife, and means for adjusting the curved edge of the shield parallel with the cutting plane of said knife toward and away from the curved edge thereof.

3. In combination, a circular meat slicing knife, a knife shield having an edge thereof curved to conform to the curvature of said knife and having said edge positioned in close proximity to the edge of said knife, and means for adjusting the edge of said shield radially relative to said knife.

4. In combination, a meat slicing knife, means for sharpening said knife, a shield positioned adjacent the surface of said knife and having an edge shaped to conform to the edge of said knife and positioned in close proximity thereto, and means for adjusting the edge of said shield relative to the edge of the knife in a direction substantially parallel with the lateral surface of said knife to keep the two edges substantially the same distance from one another as the knife is worn away by said sharpening device.

5. In combination, a circular meat slicing knife, means for rotating said knife, a sharpening device arranged to sharpen the edge of said knife, a stationary shield positioned at one side of said knife and having one edge curved to conform to the curvature of the cutting edge of said knife and positioned closely adjacent thereto, and means for adjusting the edge of said shield toward and away from the edge of said knife in a direction approximately parallel with the cutting plane of said knife.

6. In combination, a meat slicing knife, and a shield for one side of said knife extending adjacent and shielding substantially the entire lateral surface of said knife otherwise exposed to contact with a slice as it is severed by said knife, said shield being mounted to move into and out of operative position adjacent said side of said knife.

7. In combination, a meat slicing knife, a shield mounted adjacent one side of said knife, and extending adjacent and shielding substantially the entire lateral surface of said knife otherwise exposed to contact with a slice as it is severed by said knife, and a pivotal support for said shield arranged to permit movement of said shield toward and away from said knife.

8. In a slicing machine, a rotary circular meat slicing knife, a frame for said knife, and a shield for one side of said knife pivotally carried on said frame and extending adjacent and shielding substantially the entire lateral surface of said knife otherwise exposed to contact with a slice as it is severed by said knife.

9. In a meat slicing machine, a rotary circular meat slicing knife, a frame for the support of said knife, a shield for one side of said knife extending adjacent and shielding substantially the entire lateral surface of said knife otherwise exposed to contact with a slice as it is severed by said knife and having one edge thereof curved to conform to the curvature of the cutting edge of said knife, and a pivotal support for said shield arranged to permit movement of said shield toward and away from the side of said knife.

10. In a slicing machine, a rotary meat slicing knife, a shield positioned adjacent the surface of said knife and having one edge thereof positioned adjacent the cutting edge of said knife, and means for adjusting said shield parallel with the cutting plane of said knife and toward and away from said plane.

11. In combination, a meat slicing knife and a shield positioned adjacent one surface of said knife and means for adjusting said shield parallel with said surface and toward and away from said surface.

12. In combination, a circular meat slicing knife, a frame for said knife, a socket member pivotally carried on said frame, and a shield adjustably mounted in said socket member and arranged to be moved into and out of position adjacent one surface of said knife.

13. In a meat slicing machine, a meat slicing knife, a frame for the support of said knife, a shield for said knife positioned adjacent one side thereof and having one edge arranged to conform to the cutting edge of said knife and closely adjacent thereto, means for adjusting the edge of said shield relative to the edge of said knife in a direction parallel with the cutting plane of said knife, and means for moving said shield away from said knife.

14. In a meat slicing machine, a rotary circular meat slicing knife, a sharpening device arranged to coöperate with said knife, a frame for supporting said knife, a flat shield pivotally carried on said frame and having one edge thereof curved to conform to the cutting edge of said knife and positioned closely adjacent thereto, means for adjusting said shield relative to the cutting edge of said knife in a direction substantially parallel with the cutting plane of said knife, and means for pivotally supporting said shield on said frame for movement toward and away from said knife.

In testimony whereof I have signed my name to this specification, in the presence of two subscribing witnesses, on this 10th day of June A. D. 1915.

HERBERT R. GOODFELLOW.

Witnesses:
W. E. PUNSKY,
EMIL BULTZINGSLOEWEN.